US011573680B2

(12) United States Patent
Campos et al.

(10) Patent No.: US 11,573,680 B2
(45) Date of Patent: *Feb. 7, 2023

(54) SYSTEMS AND METHODS TO CONTROL NAVIGATION WITHIN AN INTERACTIVE NETWORKED APPLICATION BETWEEN INSTANCES OF ENTERPRISE SOFTWARE APPLICATIONS

(71) Applicant: INSTABASE, INC., San Francisco, CA (US)

(72) Inventors: Jessica Andersen Campos, Bend, OR (US); John Hung, South Orange, NJ (US)

(73) Assignee: Instabase, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,036

(22) Filed: Feb. 3, 2022

(65) Prior Publication Data

US 2022/0374134 A1 Nov. 24, 2022

Related U.S. Application Data

(63) Continuation of application No. 17/327,645, filed on May 21, 2021, now Pat. No. 11,281,355.

(51) Int. Cl.
*G06F 3/048* (2013.01)
*G06F 3/04817* (2022.01)
*G06F 9/451* (2018.01)

(52) U.S. Cl.
CPC .......... *G06F 3/04817* (2013.01); *G06F 9/451* (2018.02)

(58) Field of Classification Search
CPC ............................. G06F 3/04817; G06F 9/451
See application file for complete search history.

(56) References Cited

U.S. PATENT DOCUMENTS

2008/0052642 A1 2/2008 Champion
2009/0006981 A1 1/2009 Pagan
2009/0113333 A1* 4/2009 Dellinger ................ G06F 9/451
715/771

* cited by examiner

*Primary Examiner* — Tadesse Hailu
*Assistant Examiner* — Darrin Hope
(74) *Attorney, Agent, or Firm* — Esplin & Associates, PC

(57) ABSTRACT

Systems and methods to control navigation within an interactive networked application between instances of enterprise software applications are described herein. Exemplary implementations may: present a given subordinate interface to a user, the given subordinate interface including a given navigation toolbar; receive first user input; present a first subordinate interface to the user, the subordinate interface including a first navigation toolbar; modify the given navigation toolbar to include a first icon and a first indicator; receive second user input; present a second subordinate interface to the user, the second subordinate including a second navigation toolbar; modify the first navigation toolbar to include a second icon and a second indicator; modify the given navigation toolbar to include the second icon and the second indicator; and/or perform other operations.

20 Claims, 6 Drawing Sheets

SYSTEMS AND METHODS TO CONTROL NAVIGATION WITHIN AN INTERACTIVE NETWORKED APPLICATION BETWEEN INSTANCES OF ENTERPRISE SOFTWARE APPLICATIONS

FIELD OF THE DISCLOSURE

The present disclosure relates to systems and methods for controlling navigation within an interactive networked application between instances of enterprise software applications.

BACKGROUND

Web browsers are known. Using different tabs to navigate between windows of a web browser is known. Using toolbars in user interfaces is known.

SUMMARY

One aspect of the present disclosure relates to a system configured to control navigation by users within an interactive networked application between instances of enterprise software applications. The enterprise software applications may include a first software application, a second software application, and/or other software applications. The system includes one or more processors configured by machine-readable instructions. The one or more processors may be configured to present a given subordinate interface to a user on a client computing platform associated with the user. The given subordinate interface may present an instance of an enterprise software application. The given subordinate interface may include a given navigation toolbar that facilitates navigation between one or more different subordinate interfaces that are capable of being launched in the instance of the interactive networked application. The one or more processors may be configured to receive first user input from the user. The first user input may represent selection by the user of the first software application for execution. The one or more processors may be configured to present a first subordinate interface to the user. The first subordinate interface may be included in the instance of the interactive networked application. The first subordinate interface may provide interaction between the user and the first software application during execution. The first subordinate interface may include a first navigation toolbar that facilitates navigation between the one or more different subordinate interfaces. The first navigation toolbar may include a first icon and a first indicator. The first icon may represent availability of the first software application. The first indicator may represent the first software application is currently being executed within the instance of the interactive networked application. The one or more processors may be configured to modify, responsive to receiving the first user input, the given navigation toolbar to include the first icon and the first indicator. Selection of the first icon from the given navigation toolbar may effectuate a first transition from presentation of the given subordinate interface to presentation of the first subordinate interface, such that the first subordinate interface is available for interaction with the user. The one or more processors may be configured to receive second user input from the user. The second user input represents selection by the user of the second software application for execution. The one or more processors may be configured to present a second subordinate interface to the user. The second subordinate interface may be included in the instance of the interactive networked application. The second subordinate interface may provide interaction between the user and the second software application during execution. The second subordinate interface may include a second navigation toolbar that facilitates the navigation between the one or more different subordinate interfaces that are included in the instance of the interactive networked application. The second navigation toolbar may include a second icon, a second indicator, the first icon, and the first indicator. The second icon may represent availability of the second software application. The second indicator may represent the second software application is currently being executed within the instance of the interactive networked application. The one or more processors may be configured to modify, response to receiving the second user input, the first navigation toolbar to include the second icon and the second indicator. Selection of the second icon from the first navigation toolbar may effectuate a second transition from presentation of the first subordinate interface to presentation of the second subordinate interface, such that the second subordinate interface is available for interaction with the user. The one or more processors may be configured to modify, responsive to receiving the second user input, the given navigation bar to include the second icon and the second indicator. Selection of the second icon in the given navigation toolbar may effectuate a third transition from presentation of the given subordinate interface to presentation of the second subordinate interface, such that the second subordinate interface is available for interaction with the user.

Another aspect of the present disclosure relates to a method of controlling navigation by users within an interactive networked application between instances of enterprise software applications. The enterprise software applications may include a first software application, a second software application, and/or other software applications. The method may include presenting a given subordinate interface to a user on a client computing platform associated with the user. The given subordinate interface may present an instance of an enterprise software application. The given subordinate interface may include a given navigation toolbar that facilitates navigation between one or more different subordinate interfaces that are capable of being launched in the instance of the interactive networked application. The method may include receiving first user input from the user. The first user input may represent selection by the user of the first software application for execution. The method may include presenting a first subordinate interface to the user. The first subordinate interface may be included in the instance of the interactive networked application. The first subordinate interface may provide interaction between the user and the first software application during execution. The first subordinate interface may include a first navigation toolbar that facilitates navigation between the one or more different subordinate interfaces. The first navigation toolbar may include a first icon and a first indicator. The first icon may represent availability of the first software application. The first indicator may represent the first software application is currently being executed within the instance of the interactive networked application. The method may include modifying, responsive to receiving the first user input, the given navigation toolbar to include the first icon and the first indicator. Selection of the first icon from the given navigation toolbar may effectuate a first transition from presentation of the given subordinate interface to presentation of the first subordinate interface, such that the first subordinate interface is available for interaction with the user. The method may include receiving second user input from the user. The second user input represents selection by the user of the second software application for execution. The method may include presenting a second subordinate interface to the user. The second subordinate interface may be included in the instance of the interactive networked application. The second subordinate interface may provide interaction between the user and the second software application during execution. The second subordinate interface may include a second navigation toolbar that facilitates the navigation between the one or more different subordinate interfaces that are included in the instance of the interactive networked application. The second navigation toolbar may include a second icon, a second indicator, the first icon, and the first indicator. The second icon may represent availability of the second software application. The second indicator may represent the second software application is currently being executed within the instance of the interactive networked application. The method may include modifying, response to receiving the second user input, the first navigation toolbar to include the second icon and the second indicator. Selection of the second icon from the first navigation toolbar may effectuate a second transition from presentation of the first subordinate interface to presentation of the second subordinate interface, such that the second subordinate interface is available for interaction with the user. The method may include modifying, responsive to receiving the second user input, the given navigation bar to include the second icon and the second indicator. Selection of the second icon in the given navigation toolbar may effectuate a third transition from presentation of the given subordinate interface to presentation of the second subordinate interface, such that the second subordinate interface is available for interaction with the user.

As used herein, any association (or relation, or reflection, or indication, or correspondency) involving servers, processors, client computing platforms, interactive networked applications, enterprise software applications, users, subordinate interfaces, icons, indicators, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As user herein, the term "present" (and derivatives thereof) may include show, display, emerge, introduce, appear, render, produce, and/or any combination thereof. As used herein, the term "modify" (and derivatives thereof) may include change, adjust, alter, amend, reorient, transform, add components or aspects, remove and/or delete components and/or aspects, and/or any combinations thereof. As used herein, in the context of user input, the term "receive" may include detect, accept, obtain, recognize, identify, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
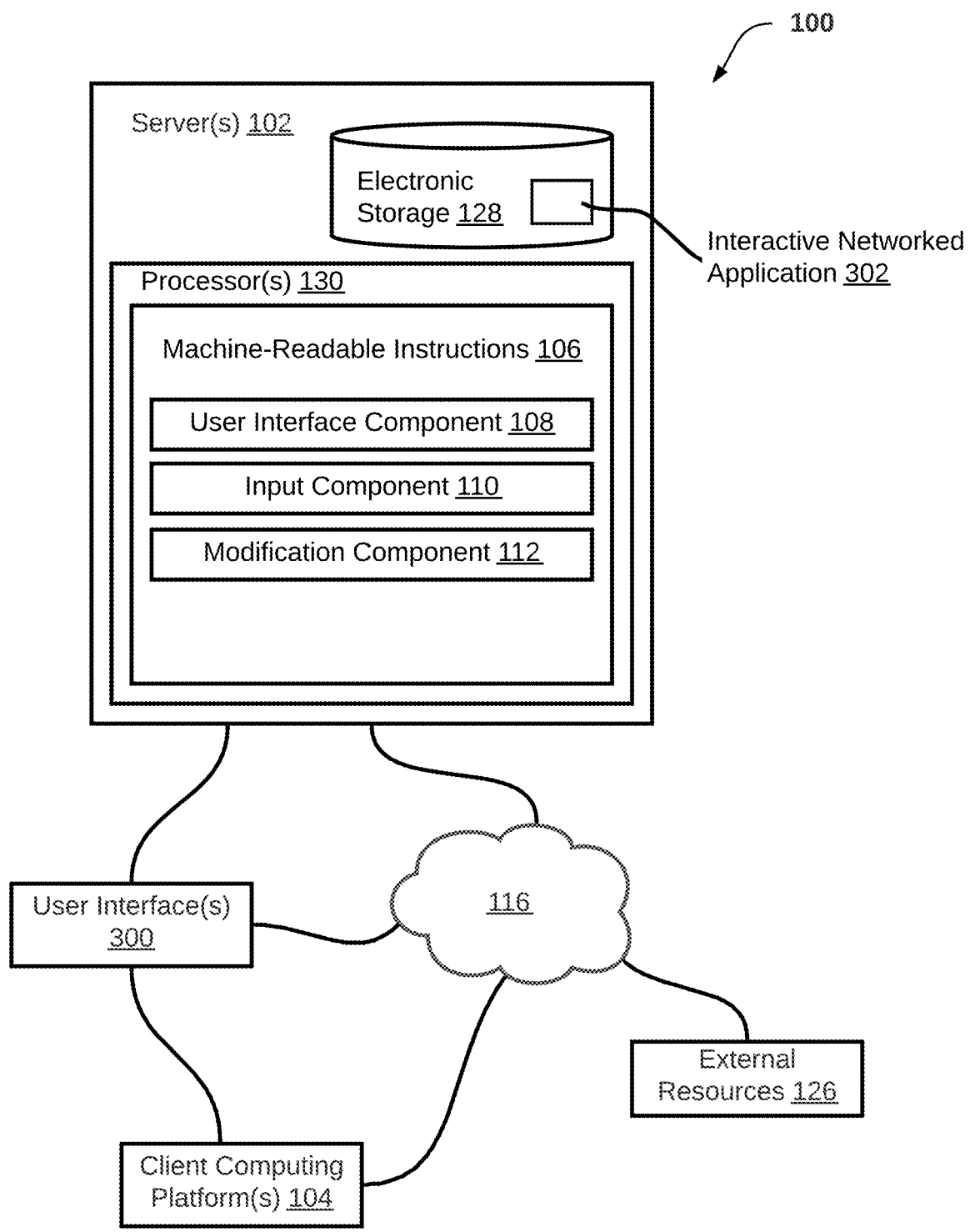
FIG. 1 illustrates a system configured to control navigation within an interactive networked application between instances of enterprise software applications, in accordance with one or more implementations.

FIG. 1 illustrates system 100 configured to control navigation within an interactive networked application between instances of enterprise software applications, in accordance with one or more implementations. The interactive networked application may be one or more of a web browser, a mobile browser, a client-server application, an application (or app) running on a client computing platform, and/or other applications. In some implementations, users may access the interactive networked application by navigating to one or more given enterprise software applications, e.g., by visiting and/or accessing one or more Uniform Resource Locators (URLs), such as, by way of non-limiting example, enterprise (web) addresses. In some implementations, users may access the interactive networked application through one or more Uniform Resource Identifiers (URIs).

In some implementations, system 100 may include one or more servers 102, one or more client computing platforms 104, external resources 126, user interface(s) 300 and/or other components. Server(s) 102 may be configured to communicate with one or more client computing platforms 104 according to a client/server architecture and/or other architectures. Client computing platform(s) 104 may be configured to communicate, through one or more networks 116, with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more of an interactive networked application 302, records, and/or other information. Machine-readable instructions 106 may include one or more instruction components. The instruction components may include computer program components. Executing the machine-readable instructions 106 may cause server(s) 102 to control navigation within interactive networked application 302 between instances of enterprise software applications. The computer program components may include one or more of a user interface component 108, an input component 110, a modification component 112, and/or other components.

User interface component 108 may be configured to present user interface(s) 300 to a user. User interface 300 may enable the user to provide input to interact with interactive networked application 302. User interface(s) 300 may include subordinate user interfaces (also referred to as subordinate interfaces). For example, user interface component 108 may present a given subordinate interface 300*a* to a user (which may also be referred to as a primary subordinate interface or a main subordinate interface). Given subordinate interface 300*a* may be presented to the user via client computing platform 104 (e.g., a particular client computing platform 104 associated with this user). Given subordinate interface 300*a* may be presented within an instance of interactive networked application 302. By way of non-limiting example, in some implementations, an individual subordinate interface may be one of multiple windows in a browser application. In some implementations, an instance of interactive networked application 302 may present or support multiple subordinate interfaces that provide interaction between the user and multiple software applications, respectively. In some implementations, interaction may be exclusive between different subordinate interfaces, such that interaction is available to the user and only one particular subordinate interface. Once the user navigates to another subordinate interface, interaction with only the other software application will be available to the user. Given subordinate interface 300*a* may present an instance of an enterprise software application. Subordinate interfaces may include navigation toolbars that facilitate navigation between one or more different subordinate interfaces, such as, e.g., different subordinate interfaces that are capable of being launched in the instance of a particular interactive networked application. In some implementations, given subordinate interface 300*a* may be one or more of a home interface, a home page, a landing interface, a landing page, a menu interface, and/or other displays and/or interfaces (e.g., with respect to a set or suite of enterprise software applications). In some implementations, given subordinate interface 300*a* may present the user with one or more enterprise software applications capable of being launched in the instance of interactive networked application 302. By way of non-limiting illustration, a user may access a web browser and navigate to an enterprise software application. The aforementioned enterprise software application may be a home page.

Input component 110 may be configured to receive user input from users. The user input may be received through user interfaces 300. The user input may include a first user input from a (first) user, and/or other user inputs from other users. The first user input may represent selection by the user of a first software application (e.g., selected from a set or suite of enterprise software applications). In some implementations, selection may include the user clicking on one or more action buttons included in given subordinate interface 300*a*, clicking on one or more icons in the given navigation toolbar, manually typing in the URL for an enterprise software application, and/or other methods of user interaction to control navigation. The individual ones of the one or more action buttons may represent an enterprise software application capable of being launched in the instance of interactive networked application 3032. By way of non-limiting example, user engagement of an individual action button and/or individual icon may launch an individual enterprise software application. In some implementations, "capable of being launched" may refer to a particular enterprise software application being stored locally in electronic storage 128 on a particular client computing platform 104, and/or stored elsewhere but accessible to a particular user. Alternatively, and/or simultaneously, this term may refer to the particular user being authorized to launch and/or otherwise execute the particular enterprise software application. In some implementations, this term may be used interchangeably with "executable".

In some implementations, user interface component 108 may be configured to present a first subordinate interface 300*b* to the user (e.g., on a particular client computing platform 104 associated with this user), responsive to receiving the first user input. First subordinate interface 300*b* may be included in the instance of a particular interactive networked application 302. For example, the instance of the particular interactive networked application 302 may include given subordinate interface 300*a* and first subordinate interface 300*b* (and, in some cases, other additional subordinate interfaces). First subordinate interface 300*b* may provide interaction between the user and the first software application during execution of the first software application. First subordinate interface 300*b* may include a first navigation toolbar. The first navigation toolbar may facilitate the navigation between the one or more different subordinate interfaces that are included in the same instance of interactive networked application 302. The first navigation toolbar may include one or more of a first icon, a first indicator, and/or other icons and/or indicators that may be (interactive) graphical user interface elements. The first icon may represent availability and/or executability of the first software application. For example, availability may mean the user is able to launch and/or otherwise execute the first software application, e.g., by clicking on the icon. The first indicator may represent the first software application is currently being executed within the instance of interactive networked application 302 (e.g., in at least one of multiple subordinate interfaces included in the interactive networked application). In some implementations, indicators may include one or more of a shape and/or graphic located near the icon. In some implementations, the indicator may include the icon being highlighted (e.g., bolded outline), the icon changing colors, the icon being magnified and/or presented larger, and/or other modifications and/or additions.

Modification component 112 may be configured to modify user interfaces 300, subordinate interfaces and/or navigation toolbars. In some implementations, modification component 112 may be configured to make modifications responsive to receiving particular user input. For example, responsive to receiving the first user input, modification component 112 may modify the given navigation toolbar, and/or other navigation toolbars. Modifications may include the addition of icons, indicators, and/or other information. For example, a modification of the given toolbar may include adding the first icon and the first indicator. Selection of the first icon from the given navigation toolbar may effectuate a first transition from presentation of given subordinate interface 300*a* to presentation of first subordinate interface 300*b*, such that first subordinate interface 300*b* becomes available for interaction with the user. In some implementations, the first transition may occur at some time after the first user input is received. Typically, this time is less than a second, or less than 2 seconds.

In some implementations, input component 110 may be configured to receive second user input from the user. The second user input represents selection by the user of a second software application (e.g., selected from a set or suite of enterprise software applications). In some implementations, selection may include the user clicking on one or more action buttons included in given subordinate interface 300a and/or first subordinate interface 300b, clicking on one or more icons in the given navigation toolbar and/or the first navigation toolbar, manually typing in the web address for the enterprise software application, and/or other mechanisms of user interaction to control navigation. The individual ones of the one or more action buttons may represent an enterprise software application capable of being launched in the instance of interactive networked application 302.

In some implementations, user interface component 108 may be configured to present a second subordinate interface 300c to the user, responsive to receiving the second user input. Second subordinate interface 300c may be included in the instance of a particular interactive networked application 302. For example, the instance of the particular interactive networked application 302 may include a given subordinate interface 300a, a first subordinate interface 300b, and the second subordinate interface 300c (and, in some cases, other additional subordinate interfaces). Second subordinate interface 300c may provide interaction between the user and the second software application during execution of the second software application. Second subordinate interface 300c may include a second navigation toolbar that facilitates the navigation between the one or more different subordinate interfaces that are included in the same instance of interactive networked application 302. The second navigation toolbar may include one or more of a second icon, a second indicator, the first icon, the first indicators, and/or other icons and/or indicators that may be (interactive) graphical user interface elements. The second icon may represent availability and/or executability of the second software application. For example, availability may mean the user is able to launch and/or otherwise execute the second software application, e.g., by clicking on the (second) icon. The second indicator may represent the second software application is currently being executed within the instance of the interactive networked application 302 (e.g., in at least one of multiple subordinate interfaces included in this interactive networked application).

In some implementations, the given navigation toolbar, the first navigation toolbar, the second navigation toolbar, and/or other toolbars may be in the same position relative to user interface 300 displaying the instance of interactive networked application 302, within the respective subordinate interfaces. By way of non-limiting illustration, the given, first, second and/or other navigation toolbars may be anchored to the bottom edge, the left edge, and/or the right edge of user interface 300 displaying the instance of interactive networked application 302, and/or other regions of the user interface 300. In some implementations, the given navigation toolbar, the first navigation toolbar, the second navigation toolbar, and/or other toolbars may include the same number of icons and/or indicators. In some implementations, the given navigation toolbar, the first navigation toolbar, the second navigation toolbar, and/or other toolbars may include the same arrangement of icons and/or indicators. By way of non-limiting example, the first icon may be presented in a first location of the first navigation toolbar and in a first location of the second navigation toolbar, such that both first locations are the same within user interface 300 displaying the instance of interactive networked application 302. The first location of the first navigation toolbar may be similar to or the same as the first location on the second navigation toolbar (depending on whether the first subordinate interface or the second subordinate interface is currently available for interaction with the user). The second icon may be presented in a second location of the first navigation toolbar and in a second location of the second navigation toolbar, such that both second locations are the same within user interface 300 displaying the instance of interactive networked application 302. The second location of the first navigation toolbar may be similar to or the same as the second location of the second navigation toolbar (depending on whether first subordinate interface 300s or second subordinate interface 300b is currently available for interaction with the user).

In some implementations, modification component 112 may be configured to modify, responsive to receiving second user input, the first navigation toolbar and/or other toolbars. In some implementations, modification component 112 may modify, responsive to particular input, one or more navigation toolbars, e.g., to include the second icon, the second indicator, and/or other graphical user interface elements. Selection of the second icon from the first navigation toolbar may effectuate a second transition from presentation of first subordinate interface 300b to presentation of second subordinate interface 300c, such that second subordinate interface 300b becomes available for interaction with the user. In some implementations, the second transition may occur responsive to the user selecting an action button within first subordinate interface 300b. The action button may represent the availability and/or executability of the second software application. The action button may be different from the second icon included in the first navigation toolbar.

In some implementations, modification component 112 may be configured to modify, responsive to receiving the second user input, the given navigation toolbar, and/or other navigation toolbars, e.g., to include the second icon and the second indicator. Selection of the second icon in the given navigation toolbar may effectuate a third transition from presentation of given subordinate interface 300a to presentation of second subordinate interface 300c, such that second subordinate interface 300c becomes available for interaction with the user. In some implementations, the third transition may occur responsive to the user selecting an action button within given subordinate interface 300a. The action button may represent availability and/or executability of the second software application. The action button may be different from the second icon included in the given navigation toolbar.

In some implementations, the given navigation toolbar, the first navigation toolbar, the second navigation toolbar, and/or other navigation toolbars may include one or more semi-permanent icons. The individual ones of the semi-permanent icons may represent individual ones on enterprise software applications (e.g., that a user may launch and/or execute). In some implementations, individual ones of the semi-permanent icons may include one or more indicators responsive to the corresponding software application currently being executed. By way of non-limiting example, a given semi-permanent icon may be included in the given, first, and second navigation toolbar, and/or other navigation toolbars. The given semi-permanent icon may represent availability (for execution) of a given enterprise software application. The given semi-permanent icon may be presented on the given, first, and second navigation toolbar, and/or other navigation toolbars, with a given indicator responsive to the given enterprise software application currently being executed. In some implementations, the individual ones of the semi-permanent icons may be included in the given, first, and second navigation toolbars, and/or other toolbars without indicators, responsive to the corresponding enterprise software application not currently being executed. By way of non-limiting illustration, the given semi-permanent icon may be included in the first and second navigation toolbar, and/or other navigation toolbars, without the given indicator responsive to the given enterprise software application not currently being executed.

In some implementations, the user may select one or more semi-permanent icons to be included in the one or more navigation toolbars. The semipermanent icons may represent availability of individual ones of enterprise software applications. Selection by the user may include one or more of interacting with an action button, selecting an item from a menu and/or list, and/or other manipulations. By way of non-limiting illustration, the user may interact with an action button. The action button may represent activation of a semi-permanent icon for an enterprise software application. Activation of a semi-permanent icon may effectuate the semipermanent icon being included in one or more navigation toolbars. For example, responsive to the user selecting the action button, the semi-permanent icon may be included in the given, first, and second navigation toolbar, and/or other navigation toolbars. In some implementations, the user may remove one or more semi-permanent icons from the given, first, and second navigation toolbars, and/or other navigation toolbars. Removal of one or more semi-permanent icons may include one or more of interacting with an action button, selecting and/or deselecting an item from a menu and/or list, and/or other manipulations. By way of non-limiting example, the user may interact with an action button. The action button may represent removal of a particular semi-permanent icon for a particular enterprise software application. Responsive to the user selecting the action button, the semi-permanent icon may be removed and/or not included in the given, first, and second navigation toolbars, and/or other navigation toolbars.

Referring to FIG. 1, in some implementations, server(s) 102, client computing platform(s) 104, and/or external resources 126 may be operatively linked via one or more electronic communication links. For example, such electronic communication links may be established, at least in part, via one or more networks 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform may include one or more processors configured to execute computer program components. The computer program components may be configured to enable an expert or user associated with the given client computing platform to interface with system 100 and/or external resources 126, and/or provide other functionality attributed herein to client computing platform (s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described in this disclosure is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 3A:
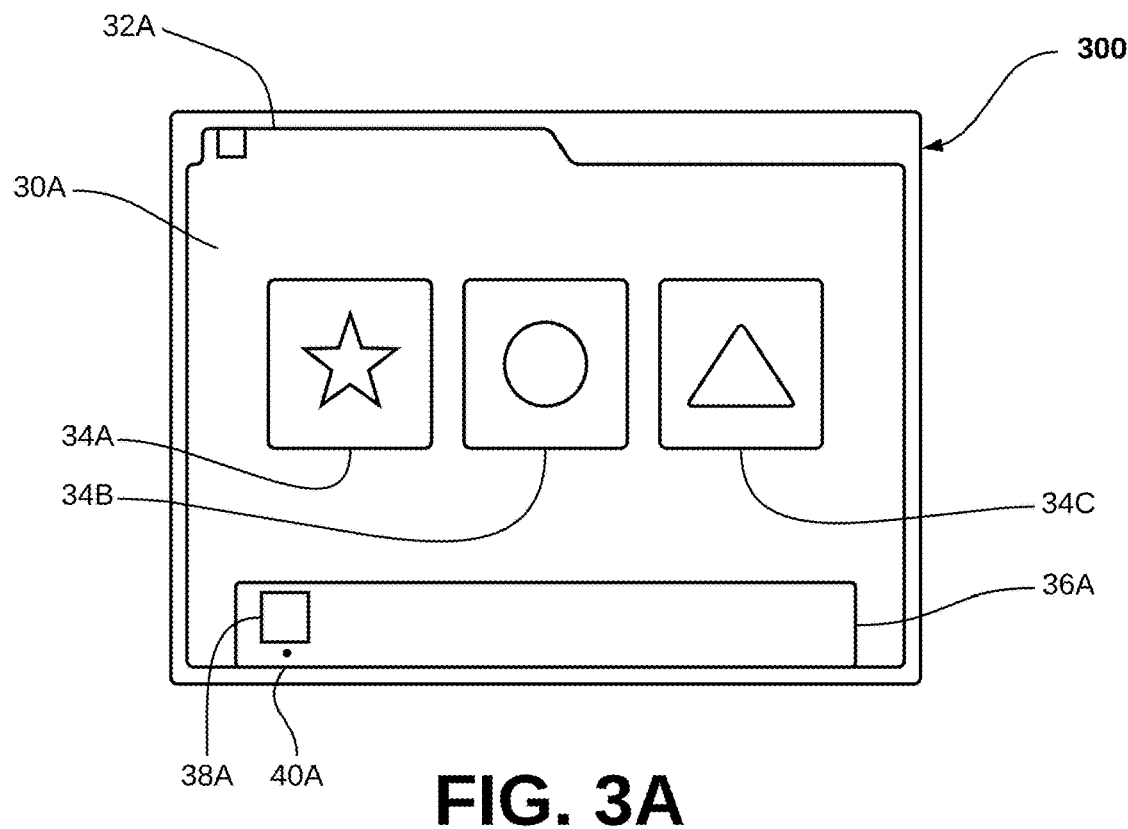
FIG. 3A 3B 3C 3D 3E 3F illustrate example implementations of an instance of an interactive networked application, as may be used by a system configured to control navigation within an interactive networked application between instances of enterprise software applications, in accordance with one or more implementations.

FIG. 3A 3B 3C 3D 3E 3F illustrate example implementations of a user interface 300 as may be used by system 100, in accordance with one or more implementations. Referring to FIG. 3A, user interface 300 may present an instance of an interactive networked application. The instance of the interactive networked application may include one or more enterprise software applications capable of being launched. User interface 300 may enable a user to provide input to present a given subordinate interface 30A and/or other subordinate interfaces. A given enterprise software application may be executed via given subordinate interface 30A. In some implementations, the given enterprise software application executed via given subordinate interface 30A may be one or more of a home application, a landing application, a menu application, and/or other displays and/or applications. Given subordinate interface 30A may include one or more of a given tab 32A, action buttons 34A-C, a given navigation toolbar 36A, and/or other components. Given navigation toolbar 36A may include one or more of a given icon 38A, a given indicator 40A (represented in FIG. 3A-F as a dot beneath given icon 38A), and/or other components. In some implementations, given icon 38A may represent the availability and/or executability of the given enterprise software application. Given indicator 40A may represent the given enterprise software application is currently being executed.

Referring to FIG. 3A, the enterprise software applications may include one or more of a first software application, a second software application, a third software application, and/or other software application. In some implementations, action button 34A may represent availability of the first software application to be executed and/or launched, action button 34B may represent availability of the second software application to be executed and/or launched, and/or action button 34C may represent availability of the third software application to be executed and/or launched. In some implementations, action buttons 34A-C and/or other action buttons may allow the user to interact with the given enterprise software application. In some implementations, the given enterprise software application may include one or more of a list, a menu, and/or a selection of available applications, and/or other displays of available applications. In some implementations, action buttons 34A-C and/or other buttons may be included in the list, the menu, the selection, and/or other displays of available applications. In some implementations, the user may provide a first user input. For example, the first user input may include the user selecting action button 34A and/or other action buttons. For example, the first user input may effectuate the execution of the first software application.

Figure 3B:
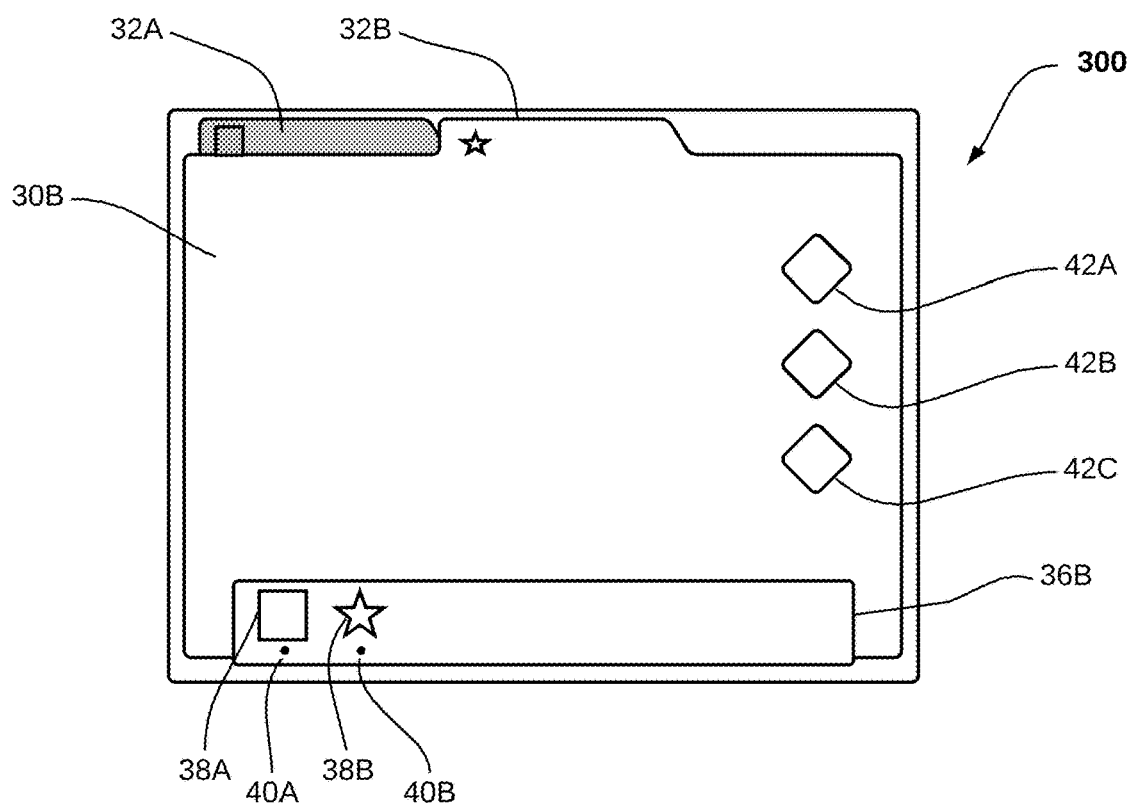

Referring to FIG. 3B, user interface 300 may, responsive to receiving the first user input, present the user with a first subordinate interface 30B, such that the first software application is available for interaction with the user. In some implementations, the first software application may be executed within first subordinate interface 30B. First subordinate interface 30B may include one or more of a first tab 32B, a first navigation toolbar 36B, one or more action buttons 42A-C (e.g., these may be specific to the first software application being executed), and/or other components. First navigation toolbar 36B may include one or more of given icon 38A, given indicator 40A, a first icon 38B, a first indicator 40B (represented in FIG. 3B-F as a dot beneath first icon 38B), and/or other icons and/or indicators. In some implementations, first navigation toolbar 36B may be instantiated with a number of icons and/or indicators that is the same as the number of subordinate interfaces included in the instance of the interactive networked application. In some implementations, first icon 38B may represent the availability and/or executability of the first software application. In some implementations, given subordinate interface 30A may not be visible to the user during presentation of first subordinate interface 30B and/or other subordinate interfaces. The given enterprise software application may still currently be executing when given subordinate interface 30A is not visible to the user. In some implementations, one or more components of given subordinate interface 30A may be visible to the user during presentation of first subordinate interface 30B and/or other subordinate interfaces. By way of non-limiting illustration, given tab 32A of given subordinate interface 30A may still be visible to the user during presentation of first subordinate interface 30B, as shown in FIG. 3B.

Figure 3C:
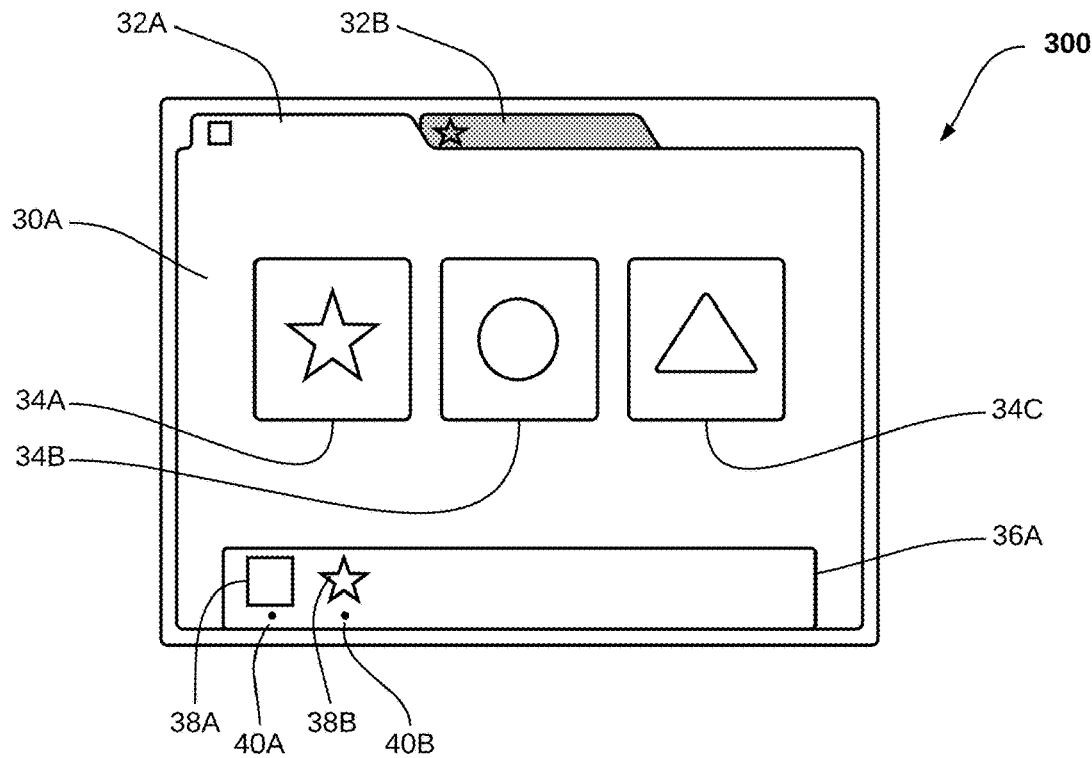

Referring to FIG. 3C, the first user input may effectuate one or more modifications of given navigation toolbar 36A and/or other navigation toolbars to include first icon 38B, first indicator 40B, and/or other icons and/or indicators. In some implementations, the one or more modifications to given navigation toolbar 36A and/or other navigation toolbars may not be visible to the user during presentation of first subordinate interface 30B (as depicted in FIG. 3B). The one or more modifications to given navigation toolbar 36A and/or other navigation toolbars may occur immediately after and/or soon after the first user input is executed. In some implementations, modifications to the given navigation toolbar 36A and/or other navigation toolbars may correspond to one or more action buttons selected by the user and/or the one or more enterprise software applications that correspond to the selected action buttons being executed.

Referring back to FIG. 3B, selection of given tab 32A by the user may effectuate a first transition from the presentation of first subordinate interface 30B to given subordinate interface 30A (as depicted in FIG. 3A), such that the given subordinate interface 30A is available for interaction with the user. In some implementations, selection of given icon 38A within first navigation toolbar 36B by the user may effectuate the first transition from the presentation of first subordinate interface 30B to given subordinate interface 30A. In some implementations, one or more of given tab 32A, first tab 32B, and/or other tabs may include one or more identifiers 31A-C. Identifiers 31A-C may indicate to the user what software applications is currently being run on the subordinate interface corresponding to the one more tabs. In some implementations, an identifier may be a web address, an application name, a label, a graphic, and/or other features. Although given tab 32A and first tab 32B are called tabs it is not meant to be limiting. In some implementations, given tab 32A, first tab 32B, and/or other tabs may be additional action buttons and/or be presented in other shapes that are not tabular and/or have other presentations.

Referring to FIG. 3A, during presentation of given subordinate interface 30A, first subordinate interface 30B and/or other subordinate interfaces may not be visible to the user and/or the first software application and/or other software applications may still currently be executing. During presentation of given subordinate interface 30A, one or more components of first subordinate interface 30B and/or other subordinate interfaces may be visible to the user. By way of non-limiting illustration, first tab 32B may be visible to the user during presentation of given subordinate interface 30A. In some implementations, first tab 32B may be the only component of first subordinate interface 30B that is visible during presentation of given subordinate interface 30A. In some implementations, user selection of tab 32B and/or first icon 38B may effectuate a transition back to the presentation of first subordinate interface 30A, such that the first subordinate interface 30B is available for interaction with the user.

Figure 3D:
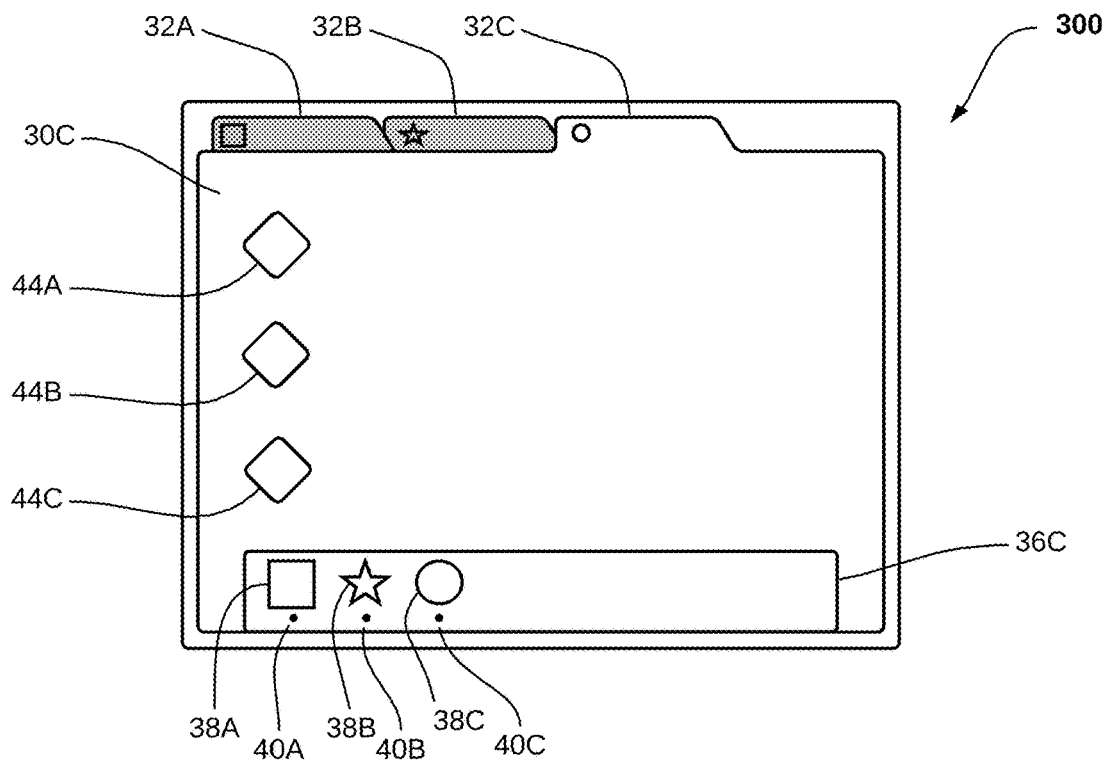

Referring to FIG. 3C, in some implementations, the user may provide a second user input. For example, the second user input may include the user selecting action button 34B on given subordinate interface 30A and/or other action buttons. For example, the second user input may effectuate the execution of the second software application. User interface 300 may, responsive to receiving the second user input, present the user with a second subordinate interface 30C, such that the second software application is available for interaction with the user. In some implementations, the second software application may be executed within second subordinate interface 30C. Second subordinate interface 30C may include one or more of a second tab 32C, a second navigation toolbar 36C, one or more action buttons 44A-C (e.g., these may be specific to the second software application being executed), and/or other components. Second navigation toolbar 36C may include one or more of given icon 38A, given indicator 40A, first icon 38B, first indicator 40B, a second icon 38C, a second indicator 40C (represented in FIG. 3D-F as a dot beneath first icon 38C), and/or other icons and/or other indicators. In some implementations, second navigation toolbar 36C may be instantiated with a number of icons and/or indicators that is the same as the number of subordinate interfaces included in the instance of the interactive networked application. In some implementations, second icon 38C may represent the availability and/or executability of the second software application. In some implementations, given subordinate interface 30A, first subordinate interface 30B, and/or other subordinate interfaces may not be visible to the user during presentation of second subordinate interface 30C and/or other subordinate interfaces. The given enterprise software application, the first software application, and/or other software applications may still currently be executing when given subordinate interface 30A, first subordinate interface 30B, and/or other subordinate interfaces are not visible to the user. In some implementations, one or more components of given subordinate interface 30A may be visible to the user during presentation of second subordinate interface 30C and/or other subordinate interfaces. In some implementations, one or more components of first subordinate interface 30B may be visible to the user during presentation of second subordinate interface 30C and/or other subordinate interfaces. By way of non-limiting illustration, given tab 32A, first tab 32B, and/or other components of given subordinate interface 30A, first subordinate interface 30B, and/or other subordinate interfaces may still be visible to the user during presentation of second subordinate interface 30C, as shown in FIG. 3D.

Referring to FIG. 3C, the second user input may effectuate one or more modifications of given navigation toolbar 36A, first navigation toolbar 36B, and/or other navigation toolbars to include second icon 38C, second indicator 40C, and/or other icons and/or indicators. In some implementations, the one or more modifications to given navigation toolbar 36A, first navigation toolbar 36B, and/or other navigation toolbars may not be visible to the user during presentation of second subordinate interface 30C. The one or more modifications to given navigation toolbar 36A, first subordinate interface 30C, and/or other subordinate interfaces may occur immediately after and/or soon after the second user input is executed. In some implementations, modifications to the given navigation toolbar 36A, first navigation toolbar 36B, and/or other navigation toolbars may correspond to one or more action buttons selected by the user and/or the one or more enterprise software applications that correspond to the selected action buttons.

Figure 3E:
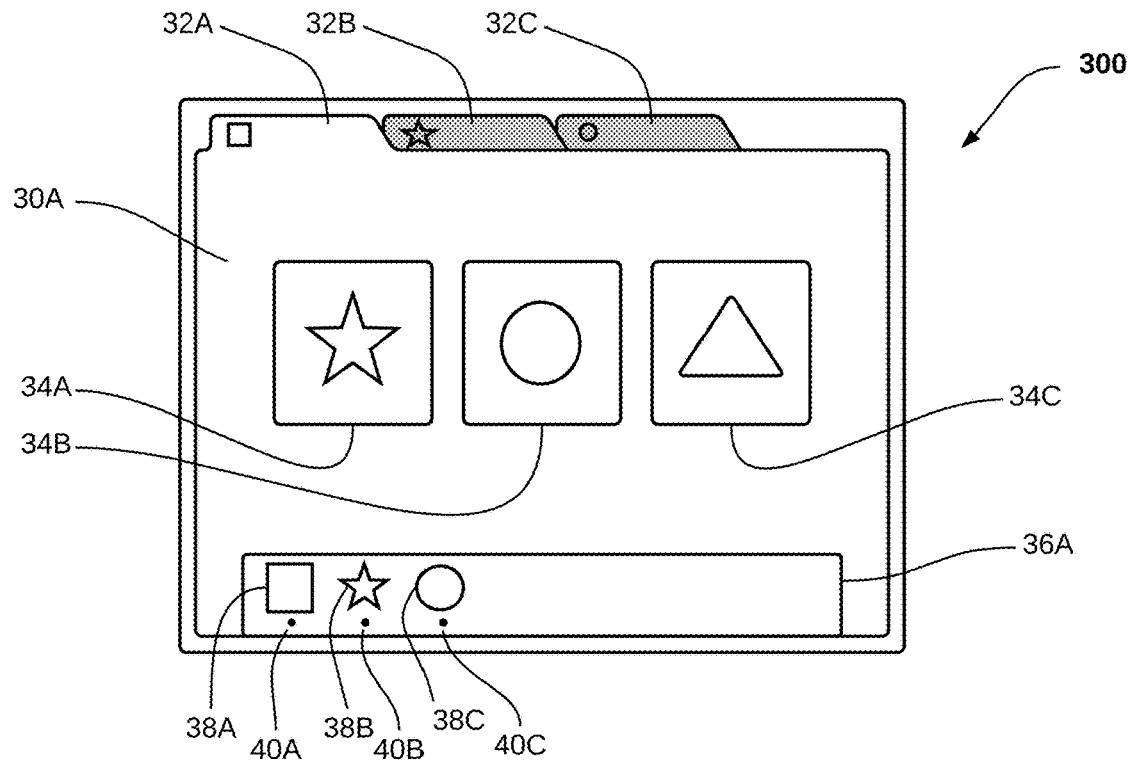

Referring to FIG. 3E, selection of given tab 32A by the user may effectuate a second transition from the presentation of second subordinate interface 30C to given subordinate interface 30A, such that the given subordinate interface 30A is available for interaction with the user. In some implementations, selection of given icon 38A within second navigation toolbar 36C by the user may effectuate the second transition from the presentation of second subordinate interface 30C to given subordinate interface 30A.

Figure 3F:
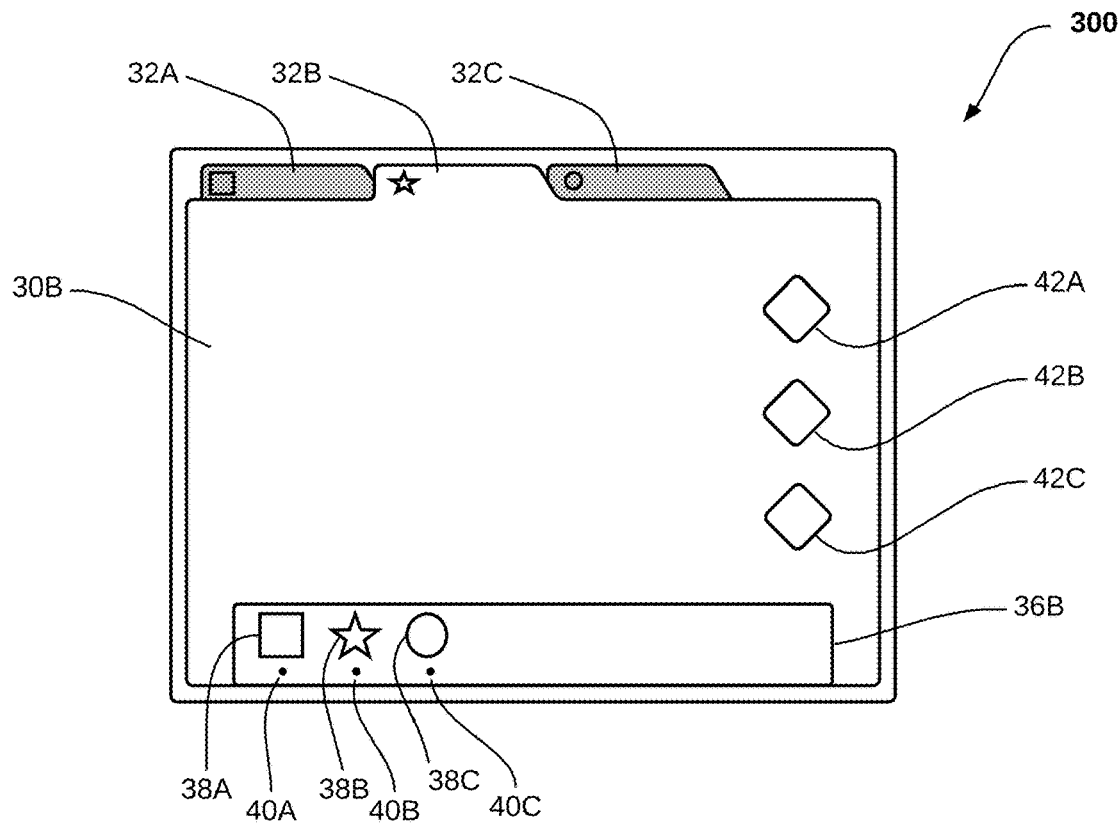

Referring to FIG. 3F, in some implementations, the selection of first tab 32B by the user may effectuate a third transaction from the presentation of the second subordinate interface 30C to first subordinate interface 30B, such that the first subordinate interface 30B is available for interaction with the user. In some implementations, selection of first icon 38B within second navigation toolbar 36C by the user may effectuate the third transition from the presentation of second subordinate interface 30C to first subordinate interface 30B.

Figure 4A:
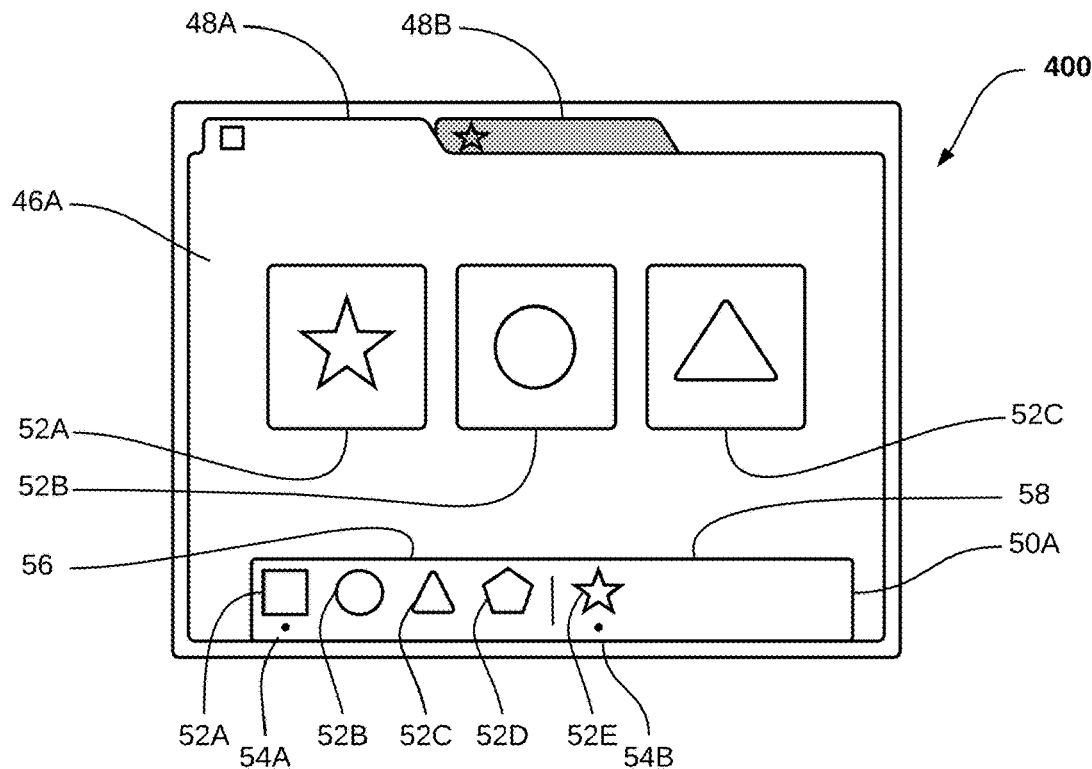
FIG. 4A-4B illustrate example implementations of an instance of an interactive networked application, as may be used by a system configured to control navigation within an interactive networked application between instances of enterprise software applications, in accordance with one or more implementations.
Figure 4B:
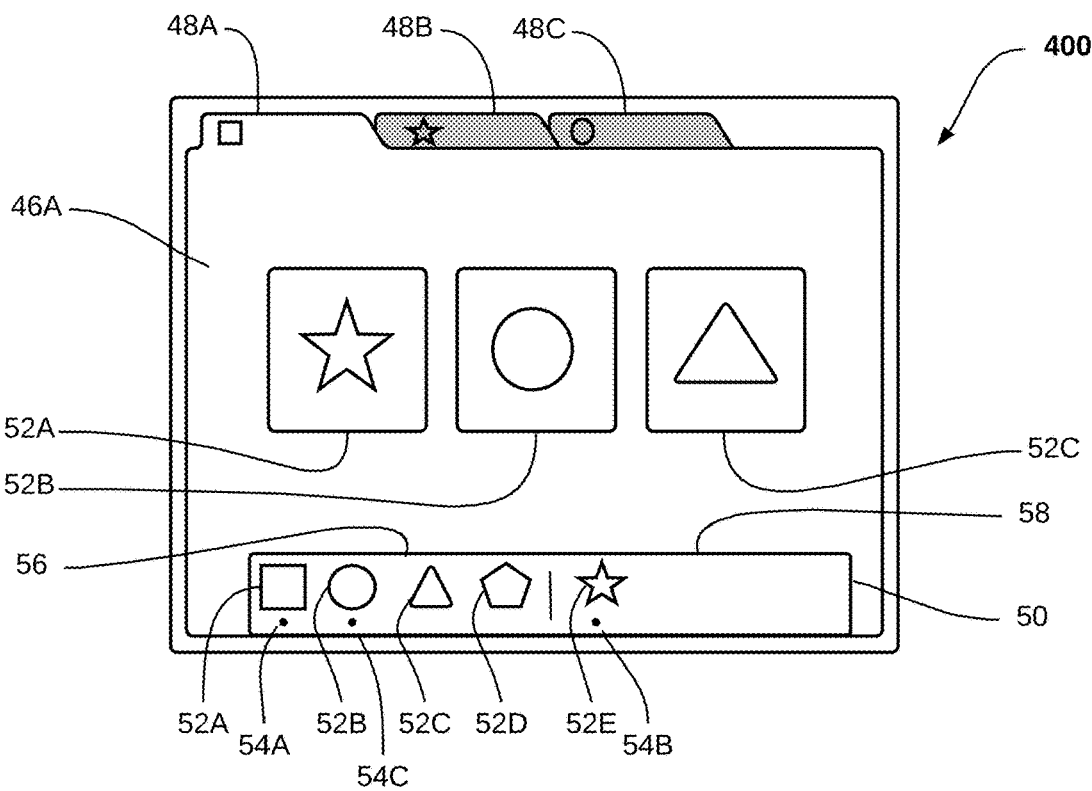

FIG. 4A-B illustrates an example implementation of a user interface 400 as may be used by system 100, in accordance with one or more implementations. Referring to FIG. 4A, user interface 400 may present an instance of an interactive networked application. The instance of the interactive networked application may include one or more enterprise software applications capable of being launched. The enterprise software applications may include a first software application, a second software application, a third software application, a fourth software application, and/or other software applications. User interface 400 may enable a user to provide input to present a given subordinate interface 46A and/or other subordinate interfaces. A given enterprise software application may be executed via given subordinate interface 46A. The given enterprise software executed in given subordinate interface 46A may be the same as or similar to the given enterprise software described in FIG. 3A-F. The given subordinate interface 46A may include a given tab 48A, a given navigation toolbar 50, action buttons 52A-C, and/or other components. Given tab 48A may include an identifier 49A. Given navigation toolbar 50 may include icons 52A-E, indicators 54A-B, and/or other icons and/or indicators. Given navigation toolbar 50, and/or other toolbars, may include a semipermanent region 56 and a non-semipermanent region 58. A divider 60 may be located between semipermanent region 56 of given navigation toolbar 50 and non-semipermanent region 58 of given navigation toolbar 50. By way of non-limiting example, divider 60 is shown as a line.

In some implementations, one or more of given tab 48A, first tab 48B, and/or other tabs may include one or more identifiers 49A-C. Identifiers 49A-C may indicate to the user what software applications is currently being run on the subordinate interface corresponding to the one more tabs. In some implementations, an identifier may be a web address, an application name, a label, a graphic, and/or other features.

In some implementations, semipermanent region 56 may include one or more icons 52A, 52B, 52C, 52D, and/or other semipermanent icons. Individual ones of the one or more semipermanent icons may represent availability of an enterprise software application. The availability of the enterprise software application may indicate the application is capable of being launched within the instance of the interactive networked application. In some implementations, the one or more semi-permanent icons may be included in given navigation toolbar 50, and/or other toolbars, with one or more indicators during execution of the corresponding enterprise software application. In some implementations, the one or more semipermanent icons may be included in given navigation toolbar 50, and/or other toolbars, without the one or more indicators when the corresponding enterprise software is not currently being executed. By way of non-limiting illustration, given icon 52A may be a semipermanent icon and may represents the availability of the given enterprise software application. Given icon 52A may be included in given navigation toolbar 50, and/or other toolbars, with indicator 54A during execution of the given enterprise software application within subordinate interface 46A.

Referring to FIG. 4B, first icon 52B may be a semipermanent icon and may represent the availability of the first software application. First icon 52B may be included in given navigation toolbar 50, and/or other toolbars, with indicator 54C during execution of the first enterprise software application within subordinate interface 48C. In some implementations, first icon 52B may be included in given navigation toolbar 50 and/or other toolbars without indicator 54C, responsive to the first application software not currently being executed, as shown in FIG. 4A. In some implementations, a second icon 52C may be a semipermanent icon and may represent the availability of the second software application. In some implementations, a third icon 52D may be a semipermanent icon and may represent the availability of the third software application. Second icon 52C and/or third icon 52D may be included in given navigation toolbar 50, and/or other toolbars, without indicators, responsive to the second and/or third software application not currently being executed, as shown in FIG. 4A-B.

Referring to FIG. 4A, non-semipermanent region 58 of given navigation toolbar 50, and/or other toolbars, may include one or more icons 52E and/or other non-semipermanent icons. In some implementations, fourth icon 52E may be a non-semipermanent icon and represent the availability of the fourth software application. The fourth icon 52 may be included in given navigation bar 50, and/or other toolbars, in the non-semipermanent region 58 with indicator 54B, responsive to the fourth software application currently being executed. The fourth software application may be executed within subordinate interface 48B (as shown in FIG. 4A). Responsive to the fourth software application not being currently executed, icon 52E may not be included in given navigation toolbar 50, and/or other navigation toolbars.

Figure 2:
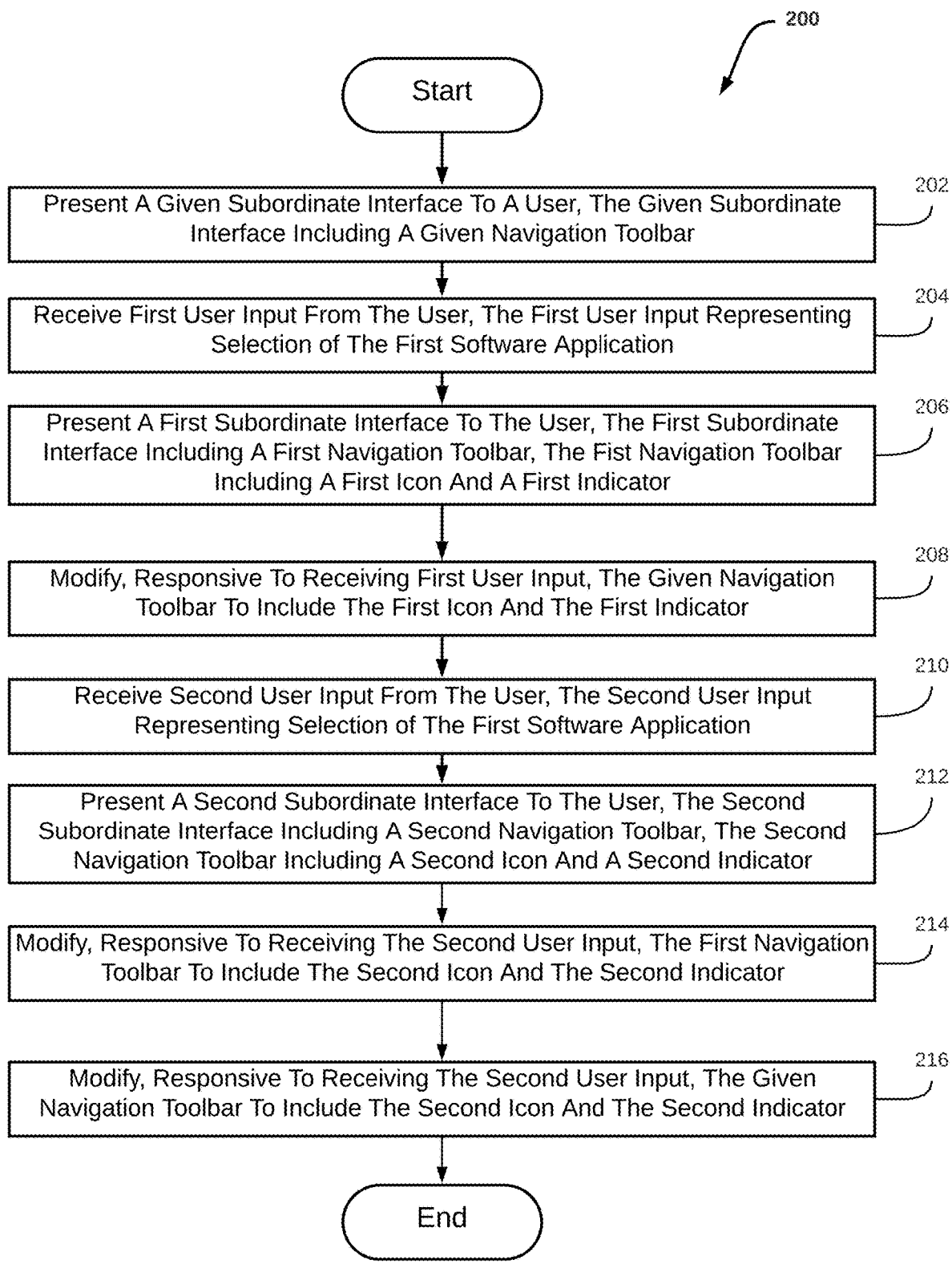
FIG. 2 illustrates a method of controlling navigation within an interactive networked application between instances of enterprise software applications, in accordance with one or more implementations.

FIG. 2 illustrates a method 200 to control navigation within an interactive networked application between instances of enterprise software applications, in accordance with one or more implementations. The enterprise software applications may include a first software application, a second software application, and/or other software applications. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not included to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may present a given subordinate interface to a user. The given subordinate interface may be presented to the user on a client computing platform. The given subordinate interface may be presented within an instance of the interactive networked application. The given subordinate interface may present an instance of an enterprise software application. The given subordinate interface may include a given navigation toolbar that facilitates navigation between one or more different subordinate interfaces that are capable of being launched in the instance of the interactive networked application. Operation 202 may be performed by a user interface component that is the same as or similar to user interface component 108 (shown in FIG. 1 and described herein), in accordance with one or more implementations.

An operation 204 may receive first user input from the user. The first user input may represent selection by the user of the first software application. In some implementations, first user input may include the user clicking on one or more action buttons included in the given subordinate interface, clicking on one or more icons in the given navigation toolbar, manually typing in the web address for the enterprise software application, and/or other methods of navigation. The individual ones of the one or more action buttons may represent an enterprise software application capable of being launched in the instance of the interactive networked application. Operation 204 may be performed by an input component that is the same as or similar to input component 110 (shown in FIG. 1 and described herein), in accordance with one or more implementations.

An operation 206 may present a first subordinate interface to the user. The first subordinate interface may be included in the instance of the interactive networked application. The first subordinate interface may provide interaction between the user and the first software application during execution. The first subordinate interface may include a first navigation toolbar. The first navigation toolbar may facilitate the navigation between the one or more different subordinate interfaces that are included in the instance of the interactive networked application. The first navigation toolbar may include one or more of a first icon, a first indicator, and/or other icons and/or indicators. The first icon may represent availability of the first software application. The first indicator may represent the first software application is currently being executed within the instance of the interactive networked application. Operation 206 may be performed by a user interface component that is the same as or similar to user interface component 108 (shown in FIG. 1 and described herein), in accordance with one or more implementations.

An operation 208 may modify, responsive to receiving the first user input, the given navigation toolbar, and/or other navigation toolbars, to include the first icon and the first indicator. Selection of the first icon from the given navigation toolbar may effectuate a first transition from presentation of the given subordinate interface to presentation of the first subordinate interface, such that the first subordinate interface is available for interaction with the user. In some implementations, the first transition may occur at some time after the first user input is received. Operation 208 may be performed by a modification component that is the same as or similar to modification component 112 (shown in FIG. 1 and described herein), in accordance with one or more implementations.

An operation 210 may receive second user input from the user. The second user input may represent selection by the user of the second software application. In some implementations, second user input may include the user clicking on one or more action buttons included in the given subordinate interface and/or the first subordinate interface, clicking on one or more icons in the given navigation toolbar and/or the first navigation toolbar, manually typing in the web address for the enterprise software application, and/or other methods of navigation. The individual ones of the one or more action buttons may represent an enterprise software application capable of being launched in the instance of the interactive networked application. Operation 210 may be performed by an input component that is the same as or similar to input component 110 (shown in FIG. 1 and described herein), in accordance with one or more implementations.

An operation 212 may present a second subordinate interface to the user. The second subordinate interface may be included in the instance of the interactive networked application. The second subordinate interface may provide interaction between the user and the second software application during execution. The second subordinate interface may include a second navigation toolbar that facilitates the navigation between the one or more different subordinate interfaces that are included in the instance of the interactive networked application. The second navigation toolbar may include one or more of a second icon, a second indicator, the first icon, the first indicators, and/or other icons and/or indicators. The second icon may represent availability of the second software application. The second indicator may represent the second software application is currently being executed within the instance of the interactive networked application. Operation 212 may be performed by a user interface component that is the same as or similar to user interface component 108 (shown in FIG. 1 and described herein), in accordance with one or more implementations.

An operation 214 may modify, responsive to receiving the second user input, the first navigation toolbar and/or other toolbars, to include the second icon and the second indicator. Selection of the second icon from the first navigation toolbar may effectuate a second transition from presentation of the first subordinate interface to presentation of the second subordinate interface, such that the second subordinate interface is available for interaction with the user. In some implementations, the second transition may occur responsive to the user selecting an action button within the first subordinate interface. The action button may represent the availability of the second software application. The action button may be different from the second icon included in the first navigation toolbar. Operation 214 may be performed by a modification component that is the same as or similar to modification component 112 (shown in FIG. 1 and described herein), in accordance with one or more implementations.

An operation 216 may modify, responsive to receiving the second user input, the given navigation toolbar, and/or other navigation toolbars, to include the second icon and the second indicator. Selection of the second icon in the given navigation toolbar may effectuate a third transition from presentation of the given subordinate interface to presentation of the second subordinate interface, such that the second subordinate interface is available for interaction with the user. In some implementations, the third transition may occur responsive to the user selecting an action button within the given subordinate interface. The action button may represent availability of the second software application. The action button may be different from the second icon included in the given navigation toolbar. Operation 216 may be performed by a modification component that is the same as or similar to modification component 112 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to control navigation between instances of enterprise software applications, wherein the enterprise software applications include a given software application, a first software application, and a second software application, the system comprising:
   one or more hardware processors configured by machine-readable instructions to:
      present to a user, on a client computing platform associated with the user, a given subordinate interface, wherein the given subordinate interface presents an instance of the given software application, wherein the given subordinate interface includes a given navigation toolbar that facilitates navigation between one or more different subordinate interfaces that are capable of being launched;
      receive first user input from the user, wherein the first user input represents selection by the user of the first software application for execution, wherein the first software application is launched for execution responsive to receiving the first user input;
      present, to the user, a first subordinate interface, wherein the first subordinate interface provides interaction between the user and the first software application during execution, wherein the first subordinate interface includes a first navigation toolbar that facilitates the navigation between the one or more different subordinate interfaces, wherein the first navigation toolbar includes a first icon and a first indicator, wherein the first icon represents the first software application and the first indicator represents the first software application is currently being executed;
      modify, responsive to receiving the first user input, the given navigation toolbar to include the first icon and the first indicator, wherein selection of the first icon from the given navigation toolbar effectuates a first transition from presentation of the given subordinate interface to presentation of the first subordinate interface, such that the first subordinate interface is available for interaction with the user;
      receive second user input from the user, wherein the second user input represents selection by the user of the second software application for execution, wherein the second software application is launched for execution responsive to receiving the second user input;

present, to the user, a second subordinate interface, wherein the second subordinate interface provides interaction between the user and the second software application during execution, wherein the second subordinate interface includes a second navigation toolbar that facilitates the navigation between the one or more different subordinate interfaces, wherein the second navigation toolbar includes a second icon, a second indicator, the first icon, and the first indicator, wherein the second icon represents the second software application, and wherein the second indicator represents the second software application is currently being executed; and responsive to receiving the second user input:
(i) modify the first navigation toolbar to include the second icon and the second indicator, wherein selection of the second icon from the first navigation toolbar effectuates a second transition from presentation of the first subordinate interface to presentation of the second subordinate interface, such that the second subordinate interface is available for interaction with the user; and
(ii) modify the given navigation toolbar to include the second icon and the second indicator, wherein selection of the second icon in the given navigation toolbar effectuates a third transition from presentation of the given subordinate interface to presentation of the second subordinate interface, such that the second subordinate interface is available for interaction with the user.

2. The system of claim 1, wherein the given navigation toolbar, the first navigation toolbar, and the second navigation toolbar are presented in a same location within the given subordinate interface, the first subordinate interface, and the second subordinate interface, respectively.

3. The system of claim 2, wherein the first icon is presented in a first location of the first and second navigation toolbar, wherein the second icon is presented in a second location in the first and second navigation toolbar, wherein the first indicator is presented in a third location of the first and second navigation toolbar, and wherein the second indicator is presented in a fourth location of the first and second navigation toolbar.

4. The system of claim 1, wherein the given navigation toolbar includes one or more semi-permanent icons, wherein individual ones of semi-permanent icons represent individual ones of enterprise software applications, wherein the individual ones of semi-permanent icons are included with indicators responsive to the corresponding software applications being currently executed.

5. The system of claim 4, wherein the first navigation toolbar and the second navigation toolbar include one or more semi-permanent icons.

6. The system of claim 5, wherein the semi-permanent icons are included in the given, first, and second navigation toolbars without indicators, responsive to the corresponding software applications not being currently executed.

7. The system of claim 6, wherein, responsive to selection by the user, one or more semi-permanent icons are added to the navigation bars, and wherein individual ones of the semi-permanent icons represents a software application.

8. The system of claim 6, wherein, responsive to selection by the user, one or more semi-permanent icons are removed from the navigation bars, and wherein individual ones of the semi-permanent icons represents a software application.

9. The system of claim 1, wherein the given, first, and second navigation bars include the same icons and indicators.

10. The system of claim 1, wherein the different subordinate interfaces are available for interaction with the user.

11. A method for controlling navigation between instances of enterprise software applications, wherein the enterprise software applications include a given software application, a first software application, and a second software application, the method comprising:

presenting to a user, on a client computing platform associated with the user, a given subordinate interface, wherein the given subordinate interface presents an instance of the given software application, wherein the given subordinate interface includes a given navigation toolbar that facilitates navigation between one or more different subordinate interfaces that are capable of being launched;

receiving first user input from the user, wherein the first user input represents selection by the user of the first software application for execution, wherein the first software application is launched for execution responsive to receiving the first user input;

presenting, to the user, a first subordinate interface, wherein the first subordinate interface provides interaction between the user and the first software application during execution, wherein the first subordinate interface includes a first navigation toolbar that facilitates the navigation between the one or more different subordinate interfaces, wherein the first navigation toolbar includes a first icon and a first indicator, wherein the first icon represents the first software application and the first indicator represents the first software application is currently being executed;

modifying, responsive to receiving the first user input, the given navigation toolbar to include the first icon and the first indicator, wherein selection of the first icon from the given navigation toolbar effectuates a first transition from presentation of the given subordinate interface to presentation of the first subordinate interface, such that the first subordinate interface is available for interaction with the user;

receiving second user input from the user, wherein the second user input represents selection by the user of the second software application for execution, wherein the second software application is launched for execution responsive to receiving the second user input;

presenting, to the user, a second subordinate interface, wherein the second subordinate interface provides interaction between the user and the second software application during execution, wherein the second subordinate interface includes a second navigation toolbar that facilitates the navigation between the one or more different subordinate interfaces, wherein the second navigation toolbar includes a second icon, a second indicator, the first icon, and the first indicator, wherein the second icon represents the second software application, and wherein the second indicator represents the second software application is currently being executed; and responsive to receiving the second user input:
(i) modifying the first navigation toolbar to include the second icon and the second indicator, wherein selection of the second icon from the first navigation toolbar effectuates a second transition from presentation of the first subordinate interface to presentation of the second subordinate interface, such that the second subordinate interface is available for interaction with the user; and (ii) modifying the given navigation toolbar to include the second icon and the second indicator, wherein selection of the second icon in the given navigation toolbar effectuates a third transition from presentation of the given subordinate interface to presentation of the second subordinate interface, such that the second subordinate interface is available for interaction with the user.

12. The method of claim 11, wherein the given navigation toolbar, the first navigation toolbar and the second navigation toolbar are presented in a same location within the given subordinate interface, the first subordinate interface, and the second subordinate interface, respectively.

13. The method of claim 12, wherein the first icon is presented in a first location of the first and second navigation toolbar, wherein the second icon is presented in a second location in the first and second navigation toolbar, wherein the first indicator is presented in a third location of the first and second navigation toolbar, and wherein the second indicator is presented in a fourth location of the first and second navigation toolbar.

14. The method of claim 11, wherein the given navigation toolbar includes one or more semi-permanent icons, wherein individual ones of semi-permanent icons represent individual ones of enterprise software applications, wherein the individual ones of semi-permanent icons are included with indicators responsive to the corresponding software applications being currently executed.

15. The method of claim 14, wherein the first navigation toolbar and the second navigation toolbar include one or more semi-permanent icons.

16. The method of claim 15, wherein the semi-permanent icons are included in the given, first, and second navigation toolbars without indicators, responsive to the corresponding software applications not being currently executed.

17. The method of claim 16, wherein, responsive to selection by the user, one or more semi-permanent icons are added to the navigation bars, and wherein individual ones of the semi-permanent icons represents a software application.

18. The method of claim 16, wherein, responsive to selection by the user, one or more semi-permanent icons are removed from the navigation bars, and wherein individual ones of the semi-permanent icons represents a software application.

19. The method of claim 11, wherein the given, first, and second navigation bars include the same icons and indicators.

20. The method of claim 11, wherein the different subordinate interfaces are available for interaction with the user.

* * * * *